United States Patent [19]
Phelps et al.

[11] Patent Number: 5,699,751
[45] Date of Patent: Dec. 23, 1997

[54] METHOD AND APPARATUS FOR IN OVO INJECTION

[75] Inventors: Patricia V. Phelps; Thomas E. Bryan, both of Raleigh, N.C.

[73] Assignee: Embrex, Inc., Research Triangle Park, N.C.

[21] Appl. No.: 723,610

[22] Filed: Oct. 2, 1996

[51] Int. Cl.$^6$ .................................................. A01K 43/00
[52] U.S. Cl. .................................................. 119/6.8
[58] Field of Search .................................. 119/6.8, 6.6, 6.5

[56] References Cited

U.S. PATENT DOCUMENTS

| | | |
|---|---|---|
| 2,477,752 | 8/1949 | Kiss . |
| 4,040,388 | 8/1977 | Miller . |
| 4,469,047 | 9/1984 | Miller . |
| 4,593,646 | 6/1986 | Miller et al. . |
| 4,681,063 | 7/1987 | Hebrank . |
| 4,903,635 | 2/1990 | Hebrank . |
| 5,056,464 | 10/1991 | Lewis . |
| 5,136,979 | 8/1992 | Paul et al. . |
| 5,444,045 | 8/1995 | Francis et al. ................ 514/12 |
| 5,505,941 | 4/1996 | Paoletti ...................... 424/93.2 |

OTHER PUBLICATIONS

Alexis L. Romanoff, *The Avian Embryo Structural and Functional Development*, North Carolina State University.

Primary Examiner—Thomas Price
Attorney, Agent, or Firm—Myers, Bigel, Sibley & Sajovec

[57] ABSTRACT

A method of introducing a beneficial material into the allantois of an avian egg through the shell thereof comprises the steps of orienting the egg to maximize a target area of the allantoic sac and directing the injection device through the shell and into the target area. The egg may be oriented with a major axis at an angle from about 10 to 45 degrees from vertical thereby causing the allantois to pool and the allantoic sac to expand immediately below the air sac on the downward side of the egg with injection occurring vertically downward through the air sac or from an angle below the air sac. Alternatively, the egg may be vertically inverted with the large end of the egg in the bottom position thereby causing the allantois to pool immediately above the air sac with injection occurring upwardly through the air sac or laterally between the air sac and the amnion. The beneficial material may be an anti-bacteria, anti-viral, anti-microbial, vaccine, growth hormone or the like.

22 Claims, 4 Drawing Sheets

METHOD AND APPARATUS FOR IN OVO INJECTION

FIELD OF THE INVENTION

The present invention relates to the introduction of beneficial materials into hatchery eggs, and more particularly to the introduction of such materials into the allantois of the egg during development of the embryo.

BACKGROUND OF THE INVENTION

Advances in poultry embryology have made possible the addition of various materials to the embryo or to the environment around the embryo within an avian egg for the purpose of encouraging beneficial effects in the subsequently hatched chick. Such beneficial effects include increased growth, prevention of disease, increasing the percentage hatch of multiple incubated eggs, and otherwise improving physical characteristics of hatched poultry. Additionally, certain types of vaccinations which could previously only be carried out upon either recently hatched or fully mature poultry can now be successful in the embryonated chick. In ovo administration techniques that replace the injection of very young hatched chicks can increase the efficiency of administration and reduce the stress on young chicks caused by injection.

Many methods of adding a beneficial material to avian eggs utilize the injection of fluids by syringe. One traditional method has been syringe injection of eggs by hand. A number of automatic egg injection devices have also been developed. These include U.S. Pat. No. 5,056,464 to Lewis; U.S. Pat. Nos. 4,903,635 and 4,681,063 to Hebrank; U.S. Pat. No. 5,136,979 to Paul, et al.; and U.S. Pat. Nos. 4,040,388, 4,469,047, and 4,593,646 to Miller, which are incorporated herein by reference for their enabling disclosure of egg injection equipment and methods. The beneficial material may be an anti-bacteria, anti-viral, anti-microbial, vaccine, growth hormone or the like.

Heretofore, injection into avian eggs has been targeted primarily to the amnion, albumin or yolk sac which comprised the greatest volume of the egg during early embryonic development. The allantois or allantoic sac is a portion of the egg that develops and then enlarges in the egg from about the 5th to 13th day and is thereafter absorbed and substantially diminishes in size until the egg is hatched. The allantoic sac functions as a respiratory surface, a calcium adsorbing tissue, a liquid waste receptacle for urine secreted by the mesonephros, and most significantly, as a water reservoir to sustain later stage development of the embryo.

The allantoic sac reaches its peak volume at about the 11th day of incubation and begins to diminish in size after about the 13th day. Because the allantoic sac essentially grows to surround the embryo, it normally exists as a relatively thin layer under the inner shell membrane which presents a difficult target for injection even during the period of maximum volume. As a result, the allantoic sac has not generally been targeted for injection in hatchery operations even though its ability to serve as aqueous storage reservoir provides a unique environment for injection during the middle to later stages of embryonic development. Injection into the allantois by hand has been practiced in the biological sciences for the purpose of culturing various microorganisms.

Recently, efforts by the poultry industry to inject into the allantois using vertical downward injection through the large end of the egg by traversing the air sac and air sac membrane have been reported, but efforts to accomplish this on a large scale using conventional egg injection equipment have produced mixed results with a significant number of injections discharging into the air sac or the amnion instead of the allantois.

It is therefore an object of the present invention to provide a method and apparatus whereby the allantoic sac may be reliably targeted for injection with beneficial materials to promote later stage embryonic development. It is a further object of the present invention to provide an improved method for reliably injecting into the allantois of an egg on a large scale using conventional egg injection equipment. It is a further object of this invention to provide an improved egg tray for facilitating the injection into the allantois of an egg on a large scale using conventional egg injection equipment. It is a yet further object of this invention to provide a method for utilizing the improved egg tray in the process of injecting into the allantois of an egg on a large scale using conventional egg equipment. These and other objects of the invention will be apparent to those skilled in the art in view of the ensuing description and claims.

SUMMARY OF THE INVENTION

In accordance with the method of the present invention, an egg presented for injection into the allantois is rotated or tilted so that the major axis of the egg is from about 10 to 180 degrees from the vertically upright position where the large end of the egg containing the air sac defines the zero degree position. Such orientation of the egg away from the vertically upright position causes the allantois to pool within the egg and the allantoic sac to enlarge in a predetermined area. The enlarged area of the allantoic sac is thereupon targeted for injection in accordance with the present invention with a high degree of success.

The angle of injection into the egg may be vertically upward, vertically downward, horizontal or at any convenient angle depending upon the orientation of the egg and the location of the enlarged portion of the allantoic sac. When the longitudinal axis of the egg is from about 30 to 45 degrees from vertical, the allantoic sac is conveniently targeted by downward vertical injection through the air sac using conventional egg injection equipment. Injection of the egg in this manner is facilitated by the novel egg tray and methods of the present invention which are designed to automatically position the egg in the desired orientation on conventional egg injection equipment.

In all cases, the injection needle is directed into the egg at a predetermined angle and depth to target the area of the allantoic sac having the greatest volume and hence the largest target area. The relationship between egg orientation, allantoic sac configuration and location and direction of injection to optimize the probability of injecting into the allantois will be apparent from the following drawings and detailed description of the invention.

DESCRIPTION OF PREFERRED EMBODIMENTS

Figure 1:
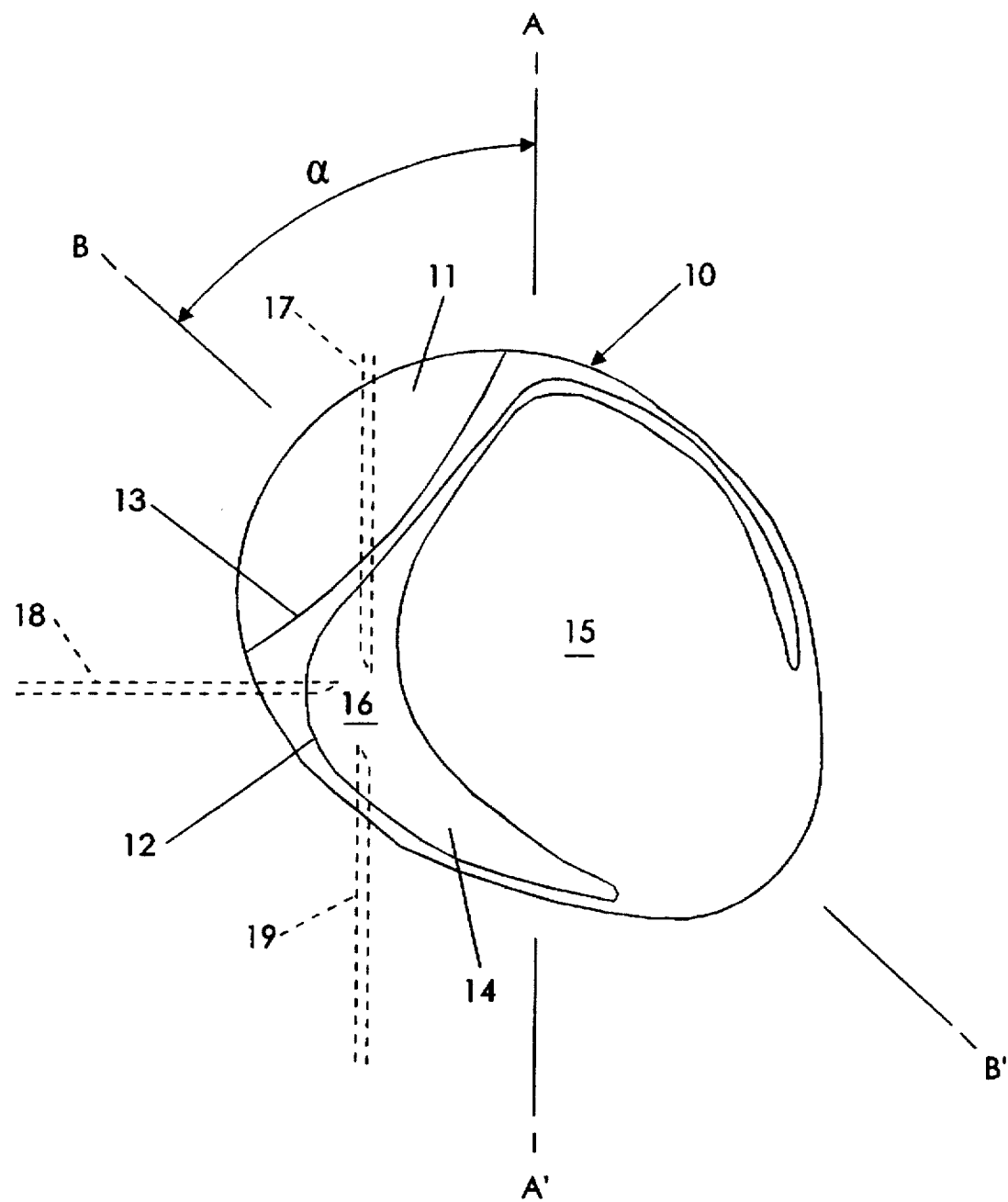
FIG. 1 is a schematic view of an avian egg having the major axis at angle α to vertical illustrating the pooling of the allantois on the lower side of the egg.

With reference to FIG. 1 there is illustrated egg 10 having the major or longitudinal axis B–B' angled from vertical axis A–A' by α degrees. Within egg 10 there is air sac 11 separated from allantoic sac 12 by air sac membrane 13. Allantoic sac 12 defines the allantois 14 which is fluid and flowable within the egg in response to changes in egg orientation. The large area of the egg indicated generally at 15 contains the amnion, albumin and yolk sac as well as the developing chick embryo (not shown).

With further reference to FIG. 1, it can be seen that the allantois pools to the lower left side of the egg as a consequence of the non-vertical orientation of the egg and thereby produces an enlarged portion of the allantoic sac indicated generally at 16. This enlarged portion of the allantoic sac forms the target area for injection of a beneficial material into the allantois.

The injection into the allantois at 16 may be effectively accomplished from several different angles as further illustrated in FIG. 1. For example, the injection may be initiated in a vertically downward direction through the large end of the egg, traversing the air sac and air sac membrane before entering the allantoic sac as illustrated by needle 17. Alternatively, the injection may be initiated from the side as illustrated by needle 18 or in a vertically upward direction as illustrated by needle 19. In each case, it is seen that the needle has direct access to the allantoic sac although the extent of needle penetration into the egg is a function of the angle of injection.

Side and bottom entry injections have an advantage in that access to the allantoic sac is more direct and shorter penetration of the egg is required. Nevertheless, the preferred method of injection is vertically downward along the path of needle 17 since this method of injection is more readily accomplished with minimum modification to existing automatic injection machines.

It will be appreciated by those skilled in the art that needles 17, 18 and 19 are shown for purposes of illustration only, that only one needle would be selected for use and that the actual location and angle of injection is a matter of choice and could be in any area around the periphery of the egg from the illustrated positions of needle 17 to beyond the illustrated position of needle 19. Orientation of the needle will depend on the orientation of the egg and the equipment available to carry out the injection. While the orientation of the egg as illustrated by angle α in FIG. 1 is about 45 degrees from vertical, the orientation may extend from about 10 degrees up to 180 degrees in which case the orientation is that shown in FIG. 2. Preferably, angle α is at least 15 degrees and preferably between about 20 to 50 degrees and most preferably from about 30 to 45 degrees in order to maximize the pooled allantois injection target area while still permitting vertically downward injection. If injection is to be undertaken with the longitudinal axis of the egg more nearly vertical, i.e., angle α is about 10 degrees, the injection needle is preferably directed into the egg in a vertically downward direction on the lower side of the air sac in order to target the allantoic sac where it extends downward along the side of the egg.

Figure 2:
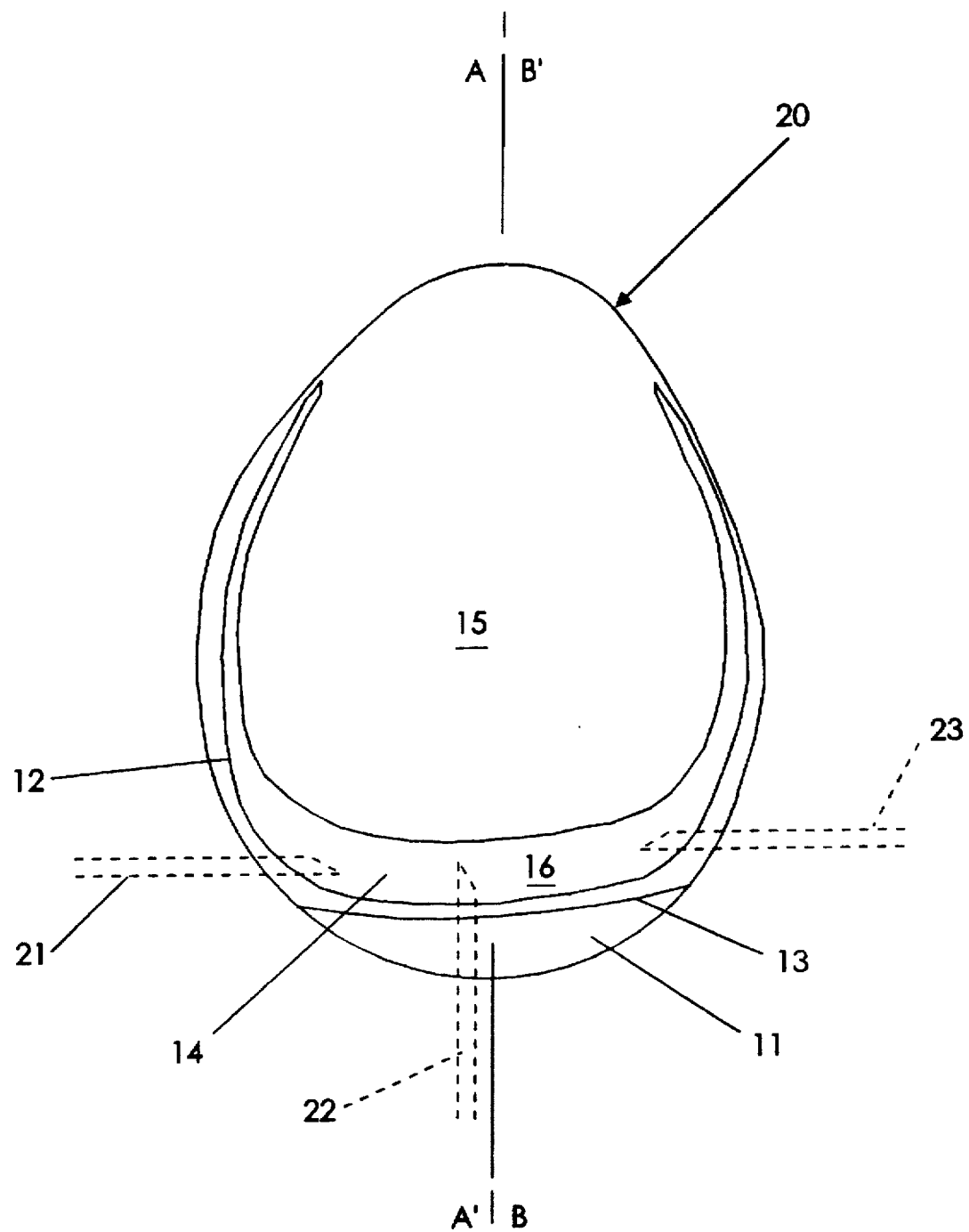
FIG. 2 is a schematic view of an avian egg which has been inverted 180 degrees from the upward vertical position illustrating the pooling of the allantois immediately above the air sac.

Referring now to FIG. 2 there is illustrated egg 20 in an inverted vertical position at 180 degrees α with the large end of the egg containing the air sac in a downward orientation along axis A–A'/B–B'. The interior components of the egg are identified as in FIG. 1. In the present configuration, the allantois 14 pools at the bottom of the egg to form enlarged portion of the allantoic sac at 16. In this orientation, the injection into the allantois may be effectively accomplished from several different angles around the lower area of the egg. For example, the injection may be vertically upward through the air sac and air sac membrane and into the allantoic sac as illustrated by needle 22. Alternatively, the injection may be made horizontally from either side as illustrated by needles 21 and 23 or anywhere around the lower periphery of the egg between needles 21 and 23. Vertically upward injection along the path of needle 22 is generally preferred for injecting eggs in this orientation since such injection can be most readily accomplished on existing egg injection equipment with a minimum of modification.

Figure 3:
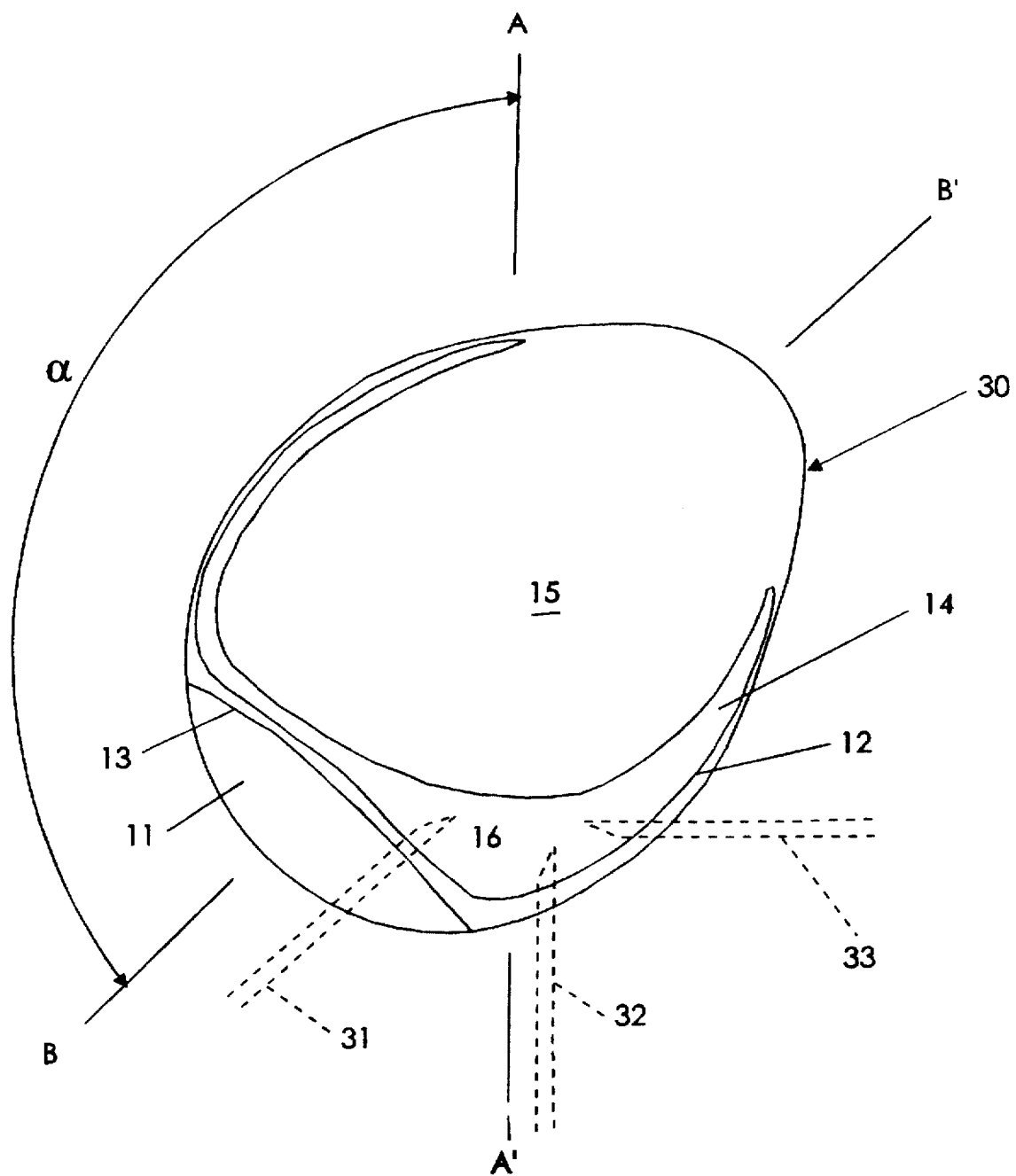
FIG. 3 is a schematic view of an avian egg having the major axis at angle α to vertical illustrating the pooling of the allantois at the lower side of the egg.

FIG. 3 illustrates egg 30 rotated to a position intermediate to that illustrated in FIG. 1 and FIG. 2, wherein angle α of major axis B–B' is about 135 degrees from the A–A' vertical axis. In this orientation, the allantois 14 pools at 16 in the lower quarter of the egg and access to the pool for purposes of injection into the allantois is most readily accomplished by vertically upward injection along the path of needle 32, horizontal injection through the side of the egg along the path of needle 33, or angled injection through the large end of the egg traversing the air sac and air sac membrane along the path of needle 31. As described above, the orientation of the egg and the angle of the injection is a matter of choice determined by the preferences of the practitioner and the capabilities of the egg injection equipment to be used.

Figure 4:
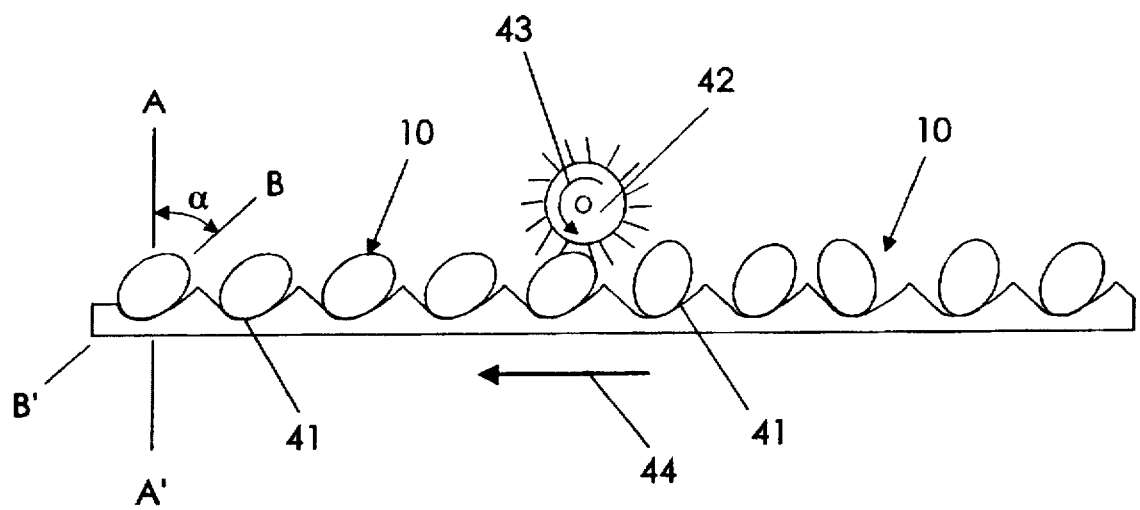
FIG. 4 is a schematic view of an egg tray and egg orientation brush for use in practicing the method of the present invention.

Turning now to FIG. 4, there is illustrated an egg tray for use in automatic egg injection equipment. The desired orientation of the eggs on the tray is α degrees from vertical corresponding to the orientation illustrated in FIG. 1, and the direction of injection is vertically downward along the path of needle 17 as illustrated in FIG. 1. The egg tray comprises a base 40 containing a plurality of egg receptacles 41 which are configured to hold the egg at the desired angle as more clearly illustrated in the enlarged view of FIG. 5.

In the practice of the present invention, the eggs are initially loaded into the egg tray in a conventional manner with the large end of the egg facing in a generally upward direction. The trays may thereupon be placed in the incubators for incubation according to conventional procedures. When the eggs are ready for injection, the egg trays are removed from the incubator and placed on the feed belt for an egg injection machine. Since the eggs will generally not be properly orientated at this stage for injection into the allantois, the egg tray is passed through an egg orientation station which may comprise for example rotating brush 42 as illustrated in FIG. 4. Brush 42 rotates in the direction of the arrow 43 and when tray 40 moves below the brush in the direction of arrow 44, the bristles of the brush sweep the egg and cause the eggs to nestle at the desired angle in receptacles 41 of the egg tray. The egg tray is constructed so that a significant portion of the egg extends above the supporting egg receptacles for contact with the rotating brush. Also in FIG. 4, it can be seen that the eggs to the left of the brush are all properly oriented while those to the right which have not yet passed under the brush are more randomly oriented.

Figure 5:
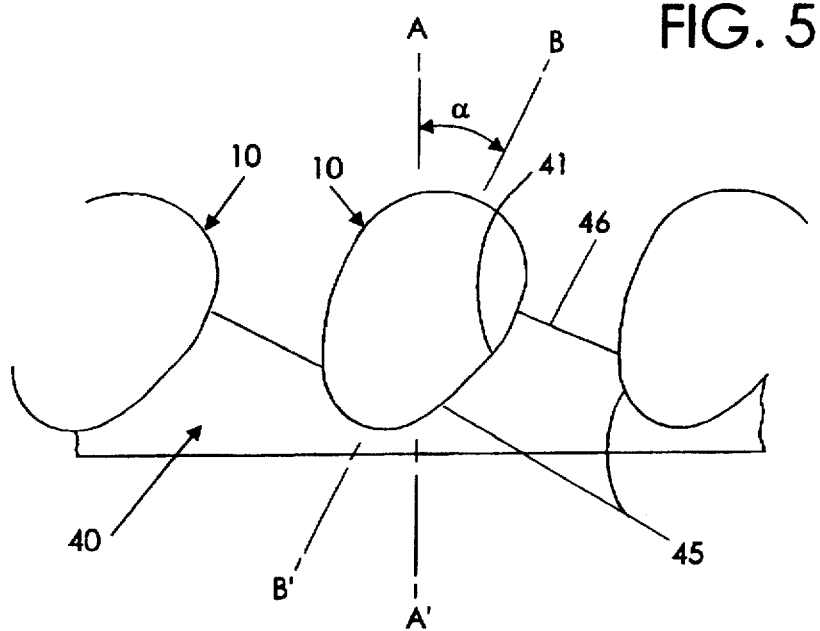
FIG. 5 is an enlarged view of an egg in the egg tray of FIG. 4 showing the configuration of the egg receptacle in greater detail.

With particular reference to FIG. 5, the configuration of the egg receptacles 41 is seen to include a generally elliptical portion 45 conforming to the shape of the small end of the egg, with a ramp portion 46 extending between adjacent receptacles. The ramp portion has a backwards slope to provide maximum support under the egg when the egg is in the desired orientation. The backward slope of ramp portion 46 also exposes a large area on the front of the egg for contact by the rotating brush as illustrated in FIG. 4, and thereby facilitates the movement of the egg into the desired orientation. The egg tray is preferably fabricated of molded plastic or other suitable material with a large percentage of open area (not shown) to permit air circulation around the eggs during the period of incubation. Such fabrication and design is a matter of choice and well within the ability of those skilled in the art.

While the present invention has been described in detail with reference to the illustrations and the preferred embodiments as depicted in the various Figures, many variations will be apparent to those skilled in the art. The present invention is accordingly not specifically limited by the illustrations or the details of the above description but only by the scope of the following claims.

That which is claimed is:

1. A method for injecting a beneficial agent into the allantois of an avian egg which comprises:

selecting an avian egg in the 5th to 18th day of incubation;

orienting the longitudinal axis of the egg to a predetermined angle from about 10 degrees to 180 degrees from vertical wherein the large end of the egg in an upwardly vertical position defines zero degrees vertical, thereby causing the allantois of the egg to pool and enlarge the allantoic sac in a predetermined area of the egg;

inserting an injection needle through the shell of the egg and into the enlarged allantoic sac in said predetermined area; and discharging the beneficial agent through the needle and into the allantois of the egg.

2. The method of claim 1 wherein the egg is in the 10th to 18th day of incubation.

3. The method of claim 1 wherein the longitudinal axis of the egg is oriented to a predetermined angle of from about 20 to 50 degrees from vertical whereby the allantois is caused to pool and enlarge the allantoic sac immediately below the air sac on the downward side of the egg.

4. The method of claim 3 wherein the injection needle is inserted vertically downward through the large end of the egg, through the air sac and into the allantois in the enlarged area of the allantoic sac.

5. The method of claim 3 wherein the injection needle is inserted vertically upward through the side of the egg below the air sac and directly into the enlarged allantoic sac.

6. The method of claim 3 wherein the injection needle is inserted at an angle to vertical through the side of the egg below the air sac and directly into the allantoic sac.

7. The method of claim 6 wherein the injection needle is inserted horizontally through the side of the egg and directly into the enlarged allantoic sac.

8. The method of claim 1 wherein the longitudinal axis of the egg is oriented to 180 degrees whereby the allantois is caused to pool and enlarge the allantoic sac immediately above the air sac at the bottom of the egg.

9. The method of claim 8 wherein the injection needle is inserted vertically upward through the air sac and into the allantois.

10. The method of claim 8 wherein the injection needle is inserted at an angle between vertically upward and horizontal which causes the needle to penetrate the allantoic sac.

11. The method of claim 10 wherein the needle is inserted horizontally through the side of the egg and directly into the allantoic sac.

12. The method of claim 1 wherein the longitudinal axis of the egg is oriented to an angle of from about 105 to 155 degrees from vertical whereby the allantois is caused to pool and enlarge the allantoic sac in the lower quadrant of the egg.

13. The method of claim 12 wherein the injection needle is inserted vertically upward through the air sac and into the allantois.

14. The method of claim 12 wherein the injection needle is inserted at an angle between vertically upward and horizontal which causes the needle to penetrate the allantoic sac.

15. The method of claim 14 wherein the injection needle is inserted horizontally through the side of the egg and directly into the allantoic sac.

16. A method for injecting a beneficial agent into the allantois of a plurality of avian eggs which comprises:

selecting a plurality of avian eggs in the 5th to 18th day of incubation;

causing said selected eggs to be oriented on an egg tray to a predetermined angle from about 10 to 180 degrees from vertical, wherein zero degrees vertical is defined by the large end of the egg in a vertically upward position, whereby the allantois of each egg is caused to pool and enlarge the allantoic sac in a predetermined area of the egg;

inserting an injection needle into each egg through the shell of the egg and into the enlarged allantoic sac in said predetermined area; and discharging a beneficial agent through the needle and into the allantois of each egg.

17. A method of claim 16 wherein the eggs are in the 10th to 18th day of incubation.

18. A method of claim 16 wherein the longitudinal axis of the egg is oriented to a predetermined angle from about 20 degrees to 50 degrees whereby the allantois is caused to pool and enlarge the allantoic sac immediately below the air sac on the downward side of each egg.

19. The method of claim 18 wherein said egg tray includes an egg receptacle configured to hold each egg at the predetermined angle.

20. The method of claim 19 wherein said eggs on said egg tray have an exposed upper surface, and said eggs are seated in said egg receptacles at said predetermined angle by egg orientation means acting against said exposed upper surface.

21. The method of claim 20 wherein said egg orientation means comprise a rotating bristle brush acting against said exposed upper surface of said eggs.

22. The method of claim 18 wherein the injection needle is inserted vertically downward through the large end of the egg through the air sac and into the enlarged allantoic sac.

* * * * *